(12) United States Patent  (10) Patent No.: US 9,459,786 B2
Thakur et al.  (45) Date of Patent: Oct. 4, 2016

(54) SYSTEMS AND METHODS FOR SHARING A USER INTERFACE ELEMENT BASED ON USER GESTURES

(71) Applicant: General Electric Company, Schenectady, NY (US)

(72) Inventors: Pavan Kumar Singh Thakur, Andhra Pradesh (IN); Robert William Grubbs, Salem, VA (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 14/136,840

(22) Filed: Dec. 20, 2013

(65) Prior Publication Data

US 2014/0359478 A1  Dec. 4, 2014

Related U.S. Application Data

(63) Continuation of application No. 13/903,056, filed on May 28, 2013, now abandoned.

(51) Int. Cl.
| | |
|---|---|
| *G06F 3/033* | (2013.01) |
| *G06F 3/0488* | (2013.01) |
| *G06F 3/0486* | (2013.01) |
| *G06F 3/01* | (2006.01) |

(52) U.S. Cl.
CPC .............. *G06F 3/0488* (2013.01); *G06F 3/017* (2013.01); *G06F 3/0486* (2013.01); *G06F 3/04883* (2013.01); *G06F 3/04886* (2013.01)

(58) Field of Classification Search
CPC .................................................... G06F 3/0488

USPC ......................................................... 715/748
See application file for complete search history.

(56) References Cited

U.S. PATENT DOCUMENTS

| | | |
|---|---|---|
| 2006/0007174 A1 | 1/2006 | Shen et al. |
| 2007/0078953 A1 | 4/2007 | Chai et al. |

(Continued)

FOREIGN PATENT DOCUMENTS

EP  1526470 A1  4/2005

OTHER PUBLICATIONS

European Search Report and Opinion issued in connection with corresponding EP Application No. 14197922.9 on May 11, 2015.

*Primary Examiner* — William Titcomb
(74) *Attorney, Agent, or Firm* — Sutherland Asbill & Brennan LLP (57) ABSTRACT

Certain embodiments herein relate to systems and methods for sharing a user interface element based on user gestures. In one embodiment, a method can include selecting, based on a user gesture, a user interface element being displayed on an output device of the source computer. The method can further include identifying a location on the output device of the source computer to move the user interface element. The method can further include updating the output device of the source computer to display the user interface element at the identified location on the output device. The method can also include generating, in response to updating the output device, a notification indicating that the source computer is sharing the user interface element. The method can also include transmitting the notification to one or more target computers in communication with the source computer.

11 Claims, 5 Drawing Sheets

(56) References Cited

U.S. PATENT DOCUMENTS

| | | | |
|---|---|---|---|
| 2009/0198719 A1* | 8/2009 | DeWitt | G11B 27/034 |
| 2012/0084672 A1 | 4/2012 | Vonog et al. | |
| 2012/0093303 A1* | 4/2012 | Schultz | H04M 1/72569 |
| | | | 379/159 |
| 2012/0194445 A1 | 8/2012 | Chang et al. | |
| 2012/0223895 A1 | 9/2012 | Lu et al. | |
| 2013/0073980 A1* | 3/2013 | Amendolagine | G06F 3/0481 |
| | | | 715/751 |
| 2013/0290855 A1 | 10/2013 | Ashcraft et al. | |
| 2014/0282066 A1* | 9/2014 | Dawson | H04L 65/4038 |
| | | | 715/748 |

* cited by examiner

SYSTEMS AND METHODS FOR SHARING A USER INTERFACE ELEMENT BASED ON USER GESTURES

RELATED APPLICATION

The present application is a continuation of and claims priority to U.S. Ser. No. 13/903,056, titled "Systems and Methods for Moving Display Objects Based on User Gestures," filed May 28, 2013, the contents of which are incorporated by reference.

FIELD OF THE DISCLOSURE

Embodiments of the disclosure generally relate to moving display objects displayed on an output device, and more particularly, to systems and methods for sharing a user interface element based on user gestures.

BACKGROUND

Electronic computing devices, such as cell phones, PDAs and laptops, provide users with increasing functionality and data storage. In addition to serving as personal organizers, these devices may allow a device user to share data and/or files with another device user using a variety of methods. For instance, the device user may share data with another device user by serializing the data, storing the data as a data file and porting the data file by copying it to a shared location that is accessible to the other device user. However, these file sharing methods are limiting, cumbersome, and time consuming.

BRIEF SUMMARY OF THE DISCLOSURE

Some or all of the above needs and/or problems may be addressed by certain embodiments of the disclosure. Certain embodiments may include systems and methods for sharing one or more user interface elements based on user gestures. According to one embodiment of the disclosure, there is disclosed a system. The system can include a source computer, one or more target computers, at least one memory operable to store computer-executable instructions and a control device operable to access the at least one memory and execute the computer-executable instructions. The instructions can be operable to select, based on a user gesture, a user interface element displayed on an output device of the source computer; identify a location on the output device of the source computer to move the user interface element; update the output device of the source computer to display the user interface element at the identified location on the output device; generate, in response to updating the output device, a notification indicating that the source computer is sharing the user interface element; and transmit the notification to one or more target computers in communication with the source computer.

According to another embodiment of the disclosure, there is disclosed a method. The method can include selecting, based on a user gesture, a user interface element being displayed on an output device of the source computer. The method can further include identifying a location on the output device of the source computer to move the user interface element. The method can further include updating the output device of the source computer to display the user interface element at the identified location on the output device. The method can also include generating, in response to updating the output device, a notification indicating that the source computer is sharing the user interface element. The method can also include transmitting the notification to one or more target computers in communication with the source computer.

In yet another embodiment, there is disclosed one or more computer-readable media storing computer-executable instructions that, when executed by a processor, make the processor operable to select, based on a user gesture, a user interface element displayed on an output device of the source computer. The processor is further operable to identify a location on the output device of the source computer to move the user interface element. The processor is further operable to update the output device of the source computer to display the user interface element at the identified location on the output device. The processor is further operable to generate, in response to updating the output device, a notification indicating that the source computer is sharing the user interface element. The processor is further operable to transmit the notification to one or more target computers in communication with the source computer.

Other embodiments, systems, methods, aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Certain embodiments disclosed herein relate to sharing a user interface element between a source computer and at least one target computer based on user gestures. In certain embodiments, the source computer may share a user interface element with the at least one target computer when they are both running the same client application. For instance, in order for the source computer to share a user interface element with at least one target computer, a user operating the source computer and another user operating the at least one target computer can first login to a client application. Upon logging into the client application, the client application may be configured to render a user interface element for display on the output device of the source computer and/or the at least one target computer. In certain embodiments, the user of the source computer may wish to share the displayed user interface element with one of the other users currently logged into the client application. To do so, the user operating the source computer may perform one or more user gestures. For example, the user may interact with the output device of the source computer by, for instance, a finger tap and/or a finger drag movement adjacent to the surface of the output device. Based upon the user gestures, the user interface element may be selected and moved to a location on the output device of the source computer, such as, for instance, a move cart user interface element. Thereafter, the output device of the source computer may be updated to display the identified user interface element within the move cart user interface element on the output device. In response to updating the output device of the source computer, a notification may be automatically generated and transmitted to the one or more target computers being operated by other users currently logged into the client application. In certain embodiments, the notification may indicate that the users of the source computer have shared a user interface element for their viewing. The other users may then view the user interface element as a child window of the client application instance running on their computers.

One or more technical effects associated with certain embodiments herein may include, but are not limited to, reduced time and expense for a user to share what he or she is seeing on an output device with other users operating other computers running the same application.

Figure 1:
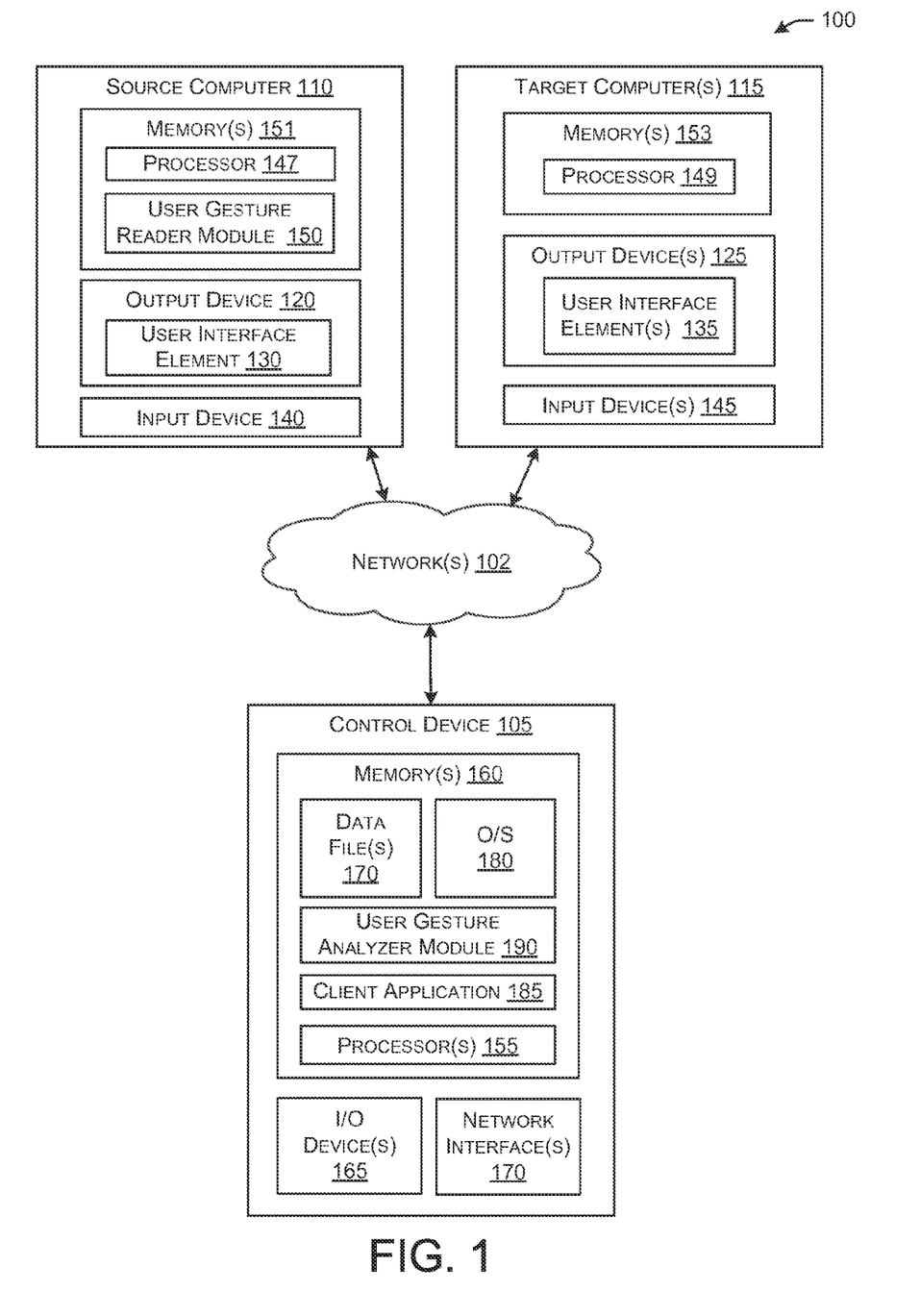
FIG. 1 illustrates an example system for sharing a user interface element based on user gestures, according to an embodiment of the disclosure.

FIG. 1 depicts a block diagram of one example system 100 that facilitates sharing a user interface element between a source computer and at least one target computer based on user gestures. According to an embodiment of the disclosure, the system 100 may include a control device 105, a source computer 110 and at least one target computer 115. In certain embodiments, one or more network(s) 102 may be provided over which the control device 105, the source computer 110 and/or the at least one target computer 115 may communicate. The network(s) 102 may include any suitable network including, but not limited to, any one or a combination of different types of communications networks, such as cable networks, the Internet, wireless networks, cellular networks, or any other private and/or public networks.

Still referring to FIG. 1, the source computer 110 and the at least one target computer 115 may include output devices 120, 125, respectively, that may be configured to respectively display, for instance, user interface elements 130, 135 that may include text, colors, images, icons, and the like. The source computer 110 and the at least one target computer 115 may further include input devices 140, 145, respectively, configured for receiving user input and may include, for instance, a keyboard, a mouse, a pen, a voice input device/interface, a touch input device/interface, and so forth. In certain embodiments, the input devices 140, 145 may include a user gesture capturing device, such as, for instance, one or more cameras and/or transparent ink pad controls disposed in close proximity to the output devices 120, 125. In certain embodiments, the input devices 140, 145 may be configured to detect one or more user gestures adjacent to the output devices 120, 125 and communicate them in real-time or near real-time to the control device 105 via the network(s) 102. In certain embodiments, the control device 105 may be configured to receive and/or analyze the user gestures from the input devices 140, 145 as described below.

With continued reference to FIG. 1, the source computer 110 and the at least one target computer 115 may include any number of suitable computer processing components that may, among other things, analyze user gestures detected by the input devices 140, 145. Examples of suitable processing devices that may be incorporated into the source computer 110 and the at least one target computer 115 may include, but are not limited to, personal computers, wearable computers, server computers, application-specific circuits, microcontrollers, minicomputers, other computing devices, and the like. As such, the source computer 110 and the at least one target computer 115 may include any number of processors 147, 149, respectively, that facilitate the execution of computer-readable instructions. By executing computer-readable instructions, the source computer 110 and the at least one target computer 115 may include or form a special purpose computer or particular machine that facilitates the processing of user gestures in order to move and/or share user interface elements 130, 135 displayed on the output devices 120, 125.

In addition, the source computer 110 and the at least one target computer 115 may include one or more memory devices 151, 153, respectively. The one or more memory devices 151, 153 or memories may include any suitable memory devices, for example, caches, read-only memory devices, random access memory devices, magnetic storage devices, etc. The one or more memory devices 151, 153 may store user gestures or other data, executable instructions, and/or various program modules utilized by the source computer 110 and/or the at least one target computer 115. For example, a software module, such as a user gesture reader module 150, may be stored in memory and executed by the processor 147 associated with the source computer 110, and may be configured to automatically, or in response to some other trigger, transmit a captured user gesture and any other information associated with user gestures to the control device 105 via the network(s) 102 as described below. In certain embodiments, a user operating the source computer 110 and/or the at least one target computer 115 may wish to launch and/or otherwise interact with a network-based software application that may be executed by the control device 105, such as, for instance, client application 185. To do so, the user may generate a request and communicate the request in real-time or near real-time to the control device 105 via the network 102. In response to the request, the control device 105 may generate and transmit a request for verifying credentials associated with the user via the network 102 in order for the user to login to the client application 185. The user may then subsequently transmit verifying credentials, such as, for instance, a user name and/or password to the control device 105 via the network(s) 102.

Upon successfully logging in to the client application 185, the control device 105 may be configured to execute the client application 185. In certain embodiments, the client application 185 may be configured to obtain, for instance, application output data from the control device 105. In certain embodiments, the application output data may then be transmitted to the source computer 110 and/or the at least one target computer 115 via the network(s) 102. In certain embodiments, the application output data may be configured to, for instance, render a user interface element, such as user interface elements 130, 135 for display on the output devices 120, 125 of the source computer 110 and/or the at least one target computer 115, respectively. Additionally, the application output data may be configured to render for display on the output devices 120, 125 a list of users currently logged into the client application 185.

Thereafter, a user operating the source computer 110 may wish to share the user interface element 130 he or she is viewing with one of the other users who are logged into the client application 185. To do so, the user operating the source computer 110 may generate one or more user gestures. To this end, the input device 140 can be configured to detect the user gestures adjacent to the output device 120 of the source computer 110 and communicate them in real-time or near real-time to the control device 105 via the network 102. In certain embodiments, the control device 105 may be configured to receive and to analyze the user gestures from the input device 140.

Based at least upon the user gestures, the control device 105 may also be configured to identify a user interface element 130, identify a location on the output device 120 to move the user interface element 130 and/or generate and transmit to the source computer 110 an updated output device 120 to display the identified user interface element 130 at the identified location on the output device 120 via the network(s) 102 as will be described.

Still referring to FIG. 1, the control device 105 may include any number of suitable computer processing components that may, among other things, analyze user gestures detected by the input devices 140, 145. Examples of suitable processing devices that may be incorporated into the control device 105 may include, but are not limited to, personal computers, wearable computers, server computers, application-specific circuits, microcontrollers, minicomputers, other computing devices, and the like. As such, the control device 105 may include any number of processors 155 that facilitate the execution of computer-readable instructions. By executing computer-readable instructions, the control device 105 may include or form a special purpose computer or particular machine that facilitates processing of user gestures in order to move and/or share user the interface elements 130, 135 displayed on the output devices 120, 125.

In addition to one or more processors 155, the control device 105 may include one or more memory devices 160, one or more input/output ("I/O") interfaces 165, and/or one or more communications and/or network interfaces 170. The one or more memory devices 160 or memories may include any suitable memory devices, for example, caches, read-only memory devices, random access memory devices, magnetic storage devices, etc. The one or more memory devices 160 may store user gestures or other data, executable instructions, and/or various program modules utilized by the control device 105, for example, data files 170, an operating system ("O/S") 180, a client application 185 and/or a user gesture analyzer module 190. The data files 170 may include any suitable data that facilitates the operation of the control device 105 including, but not limited to, information associated with one or more detected user gestures and/or information associated with one or more control actions directed by the control device 105 based on detected user gestures. The O/S 180 may include executable instructions and/or program modules that facilitate and/or control the general operation of the control device 105.

Additionally, the O/S 180 may facilitate the execution of other software programs and/or program modules by the processors 155, such as the client application 185 and/or the user gesture analyzer module 190. The client application 185 may be a suitable network-based software application that may be deployed as a client application on the source computer 110 and/or the at least one target computer 115. For instance, the client application 185 may be a power plant control system software application that may render one or more user interface elements 130, 135 for display on the output devices 120, 125. In certain embodiments, content item verifying and processing functions may be performed on the control device 105 and a user interface is hosted on the source computer 110 and/or the at least one target computer 115.

The user gesture analyzer module 190 may be a suitable software module configured to analyze and/or process user gestures detected by the input devices 140, 145. For instance, the user gesture analyzer module 190 may analyze user gestures detected by the input devices 140, 145 which may be collected and stored in the memory 160.

According to one embodiment, the control device 105 may be configured to detect one or more user gestures via the input devices 140, 145. For instance, upon viewing a user interface element 130 displayed on the output device 120, a user may generate one or more user gestures in order to identify the user interface element 130 the user would like to share with one or more other users. To do so, in one embodiment, a user may tap the screen of the output device 120 with a finger where the user interface element 130 is displayed. Thereafter, the user may identify a location on the output device 120 to move the user interface element 130 in order to indicate that the user would like to share the user interface element 130 with other users. For instance, the user may drag the user interface element 130 to a move cart user interface displayed on the output device 120.

In certain embodiments, the input devices 140 may be operable to and/or otherwise facilitate capturing detected user gestures and any other information associated with the user gestures. For instance, the input devices 140 may include one or more cameras that detect user gestures. Thereafter, a software module, such as, for instance, an associated user gesture reader module 150, which may be stored in memory and executed by the processor 147 associated with the source computer 110, may be executed and configured to automatically, or in response to some other trigger, transmit the captured user gesture and any other information associated with the user gesture to the control device 105 via the network(s) 102. Similarly, in another example, the input devices 140 may include one or more transparent ink pad controls, where upon detecting a user gesture by the transparent ink pad controls, the transparent ink pad control interface transmits the user gesture to the control device 105 via the network(s) 102.

Upon receiving the user gestures, the control device 105 may be configured to execute the user gesture analyzer module 190. The user gesture analyzer module 190 may be configured to analyze the user gestures. For instance, the user gesture analyzer module 190 may be configured to associate a location of the user gestures on the output device 120 to the location of a user interface element 130 on the output device 120. Using this example, the user gesture analyzer module 190 may determine the user interface element 130 the user would like to share. Having identified the user interface element 130 the user would like to share, in one embodiment, the user gesture analyzer module 190 may be configured to identify a location on the output device 120 to move the identified user interface element 130. To do so, in one embodiment, the user gesture analyzer module 190 may be configured to analyze the user gestures in order to identify a location where the user may have dragged the user interface element 130 to on the screen of the output device 120. Thereafter, the user gesture analyzer module 190 may be configured to update the output device 120 to display the identified user interface element 130 at the identified location on the output device 120. For instance, the user gesture analyzer module 190 may direct the communication by the control device 105 of an updated presentation of the user interface element 130 to the source computer 110 for display on the output device 120.

Upon updating the presentation of the user interface element 130 on the output device 120, the control device 105 may be configured to generate and transmit a notification indicating that the source computer 110 is sharing the user interface element 130 with the at least one target computer 115. Upon receiving the notification, a user of the target computer 115 may view the user interface element 130 on the output device 120 of the target computer 115 as discussed in further detail in FIGS. 4A-4D below.

As desired, embodiments of the disclosure may include a system 100 with more or less than the components illustrated in FIG. 1. Additionally, certain components of the system 100 may be combined in various embodiments of the disclosure. The system 100 of FIG. 1 is provided by way of example only.

Figure 2:
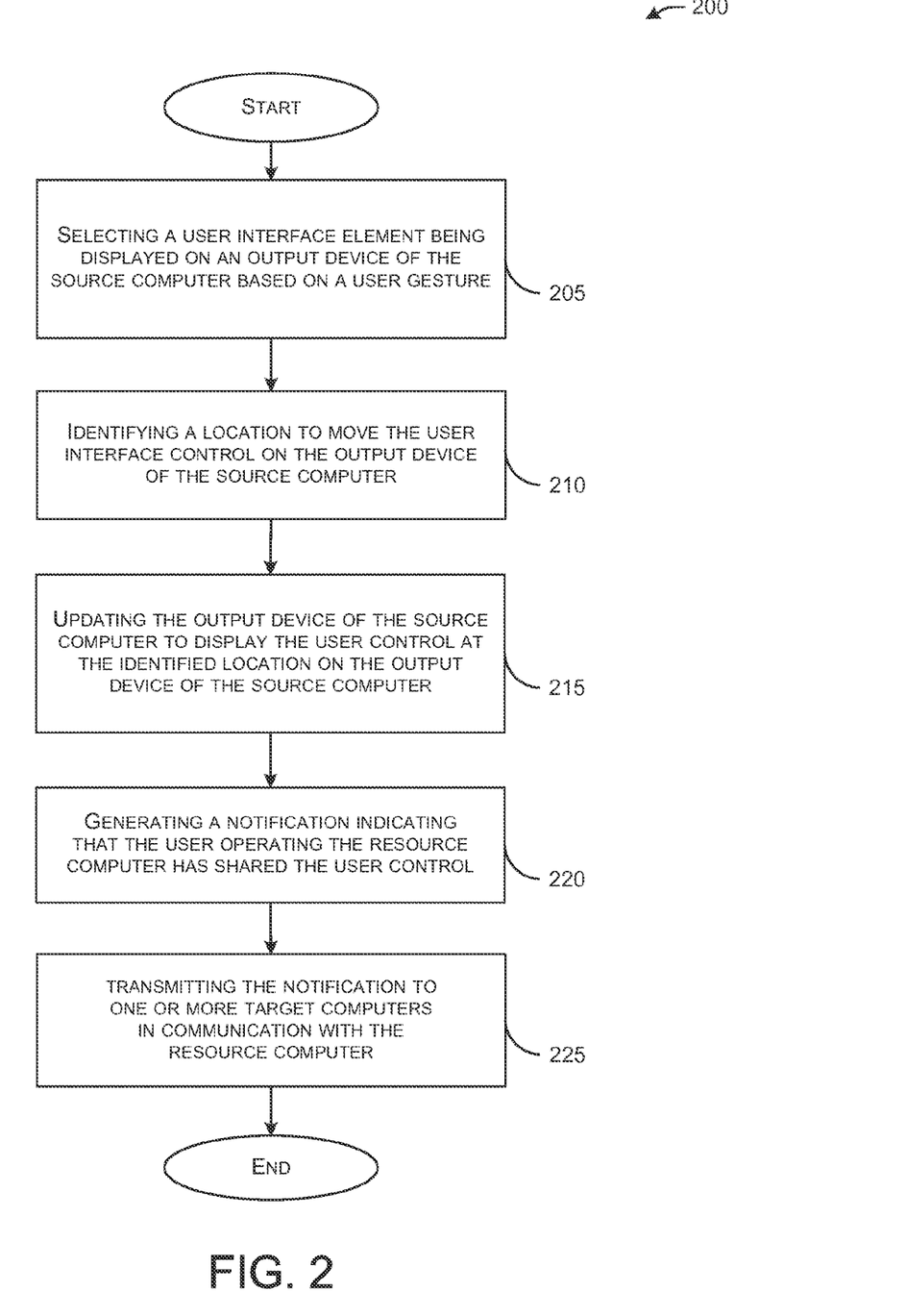
FIG. 2 is a flow diagram of an example method for sharing a user interface element based on user gestures, according to an embodiment of the disclosure.

Referring now to FIG. 2, shown is a flow diagram of an example method 200 for sharing a user interface element between a source computer and at least one target computer based on user gestures, according to an illustrative embodiment of the disclosure. The method 200 may be utilized in association with various systems, such as the system 100 illustrated in FIG. 1.

The method 200 may begin at block 205. At block 205, a control device, such as 105 in FIG. 1, may select a user interface element, such as 130 in FIG. 1, being displayed on an output device, such as 120 in FIG. 1, based on user gestures. In certain embodiments, the user gestures may be detected by an input device, such as input device 140 illustrated in FIG. 1. As described above, the user gesture may include a finger-based gesture, such as a finger tap gesture that may be generated by a user operating a source computer, such as 110 in FIG. 1.

Next, at block 210, a control device, such as 105 in FIG. 1, may identify a location on the output device, such as 120 in FIG. 1, of the source computer, such as 110 in FIG. 1, to move a selected user interface control. In certain embodiments, a user operating the source computer may drag the selected user interface control to a move cart user interface in order to indicate the user would like to share the user interface element with one or more remote users operating a respective target computer, such as 115 in FIG. 1.

Next, at block 215, a control device, such as 105 in FIG. 1, may update the output device, such as 120 in FIG. 1, of the source computer, such as 110 in FIG. 1, to display the identified user interface element, such as 130 in FIG. 1, at the identified location on the output device 120. For instance, the output device of the source computer may be updated to display the identified user interface element in the move cart user interface element at the identified location on the output device.

Next, at block 220, the control device, such as 105 in FIG. 1, may generate a notification. In certain embodiments, the notification may indicate that the user of the source computer, such as 110 in FIG. 1, has shared a user interface element, such as 130 in FIG. 1, for viewing by a user operating the at least one target computer, such as 115 in FIG. 1.

Next, at block 225, the control device, such as 105 in FIG. 1, may transmit the notification to one or more target computers, such as 115 in FIG. 1.

The method 200 of FIG. 2 may optionally end following block 215.

The operations described and shown in the method 200 of FIG. 2 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 2 may be performed. As desired, the operations set forth in FIG. 2 may also be performed in a loop as a rotating machine is monitored. For example, the operations may be performed every twenty minutes.

Figure 3A:
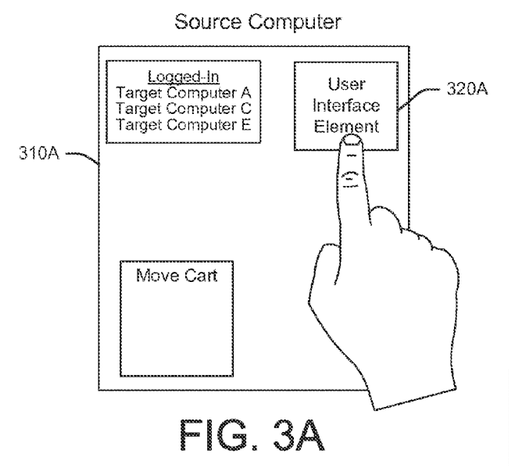
FIG. 3A is an example method for identifying a user interface element based on user gestures, according to an embodiment of the disclosure.

Referring now to FIG. 3A, shown is an example method for selecting a user interface element based on user gestures as described in block 205 of FIG. 2. As illustrated in FIG. 3A, a user interface element 320A may be displayed on an output device 310A associated with a source computer. A user operating the source computer may select the user interface element 320A by generating a user gesture. For example, as shown in FIG. 3A, a user may tap the screen of the output device 310A with a finger where the user interface element is being displayed in order to indicate the user would like to share user interface element 320A with one or more target users.

Figure 3B:
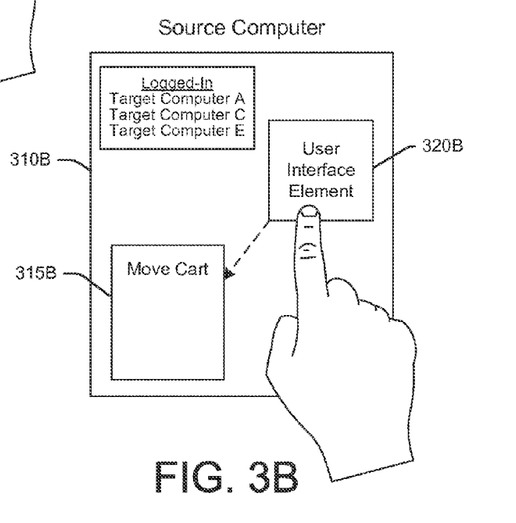
FIG. 3B is an example method for identifying a location to move a user interface element based on user gestures, according to an embodiment of the disclosure.

Next, in FIG. 3B, shown is an example method for identifying a location on the output device of a source computer to move a user interface element as described in block 210 of FIG. 2. As shown in FIG. 3B, upon selecting the user interface element 320B displayed on the output device 310B that the user would like to share, the user may drag the user interface element 320B to a location on the output device 310B, such as, for instance, move cart user interface element 315B in order to indicate the location to move the user interface element 320B on the output device 310B.

Figure 3C:
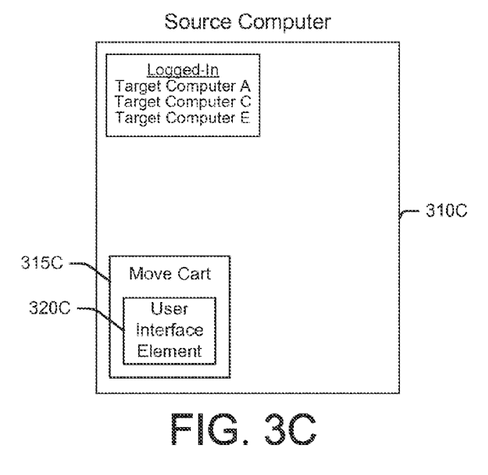
FIG. 3C is an example method for updating an output device to display an identified user interface element at an identified location on the output device, according to an embodiment of the disclosure.

Lastly, in FIG. 3C, shown is an example method for updating an output device to display an identified user interface element at an identified location on the output device as described in block 215 of FIG. 2. As shown in FIG. 3C, the output device 310C may be updated to display the user interface element 320C in a move cart user interface element 315C.

Figures 4A, 4B, 4C, 4D:
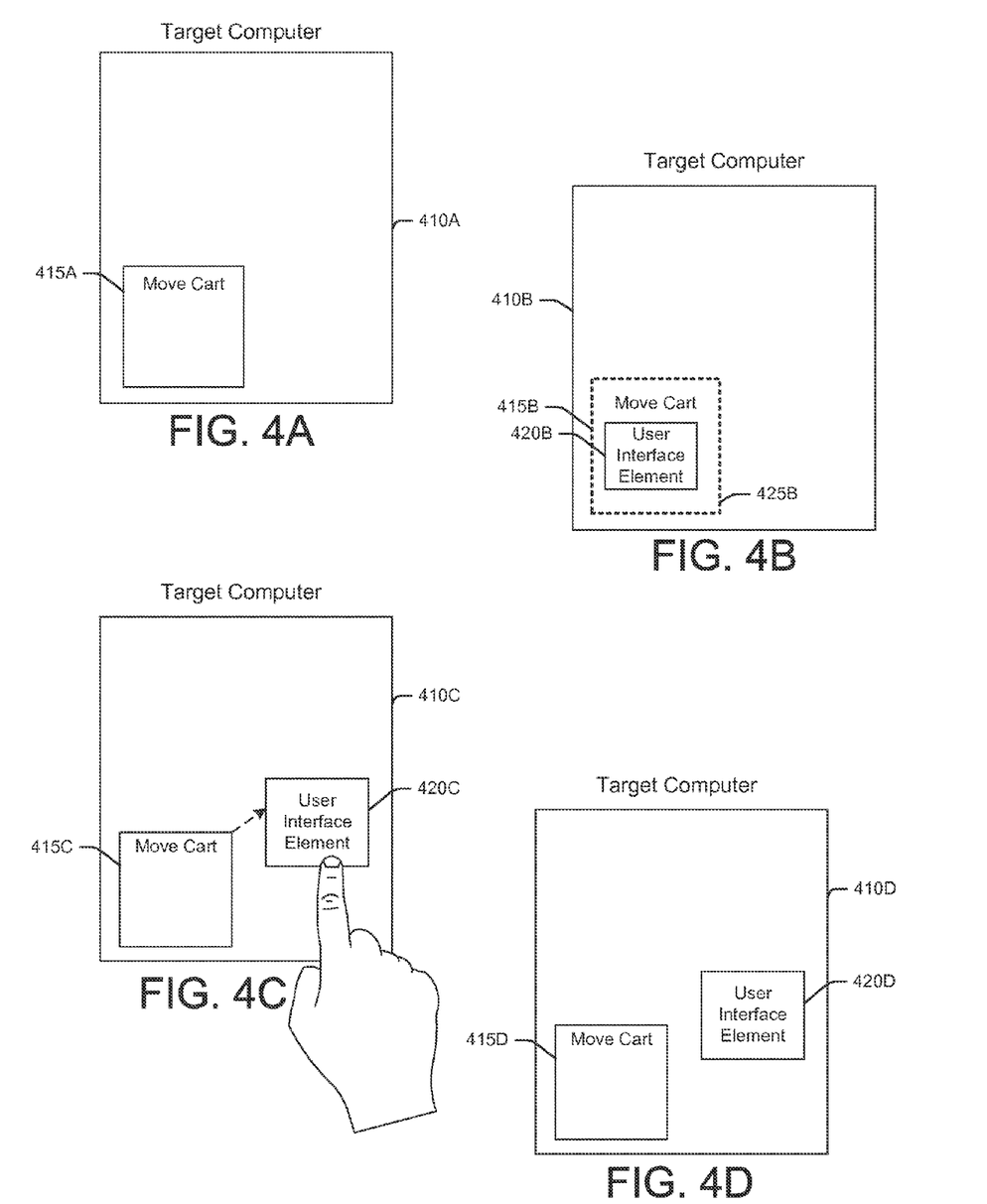
FIG. 4A is an example of an output device associated with a target computer, according to an embodiment of the disclosure.
FIG. 4B is an example of an updated output device associated with a target computer after receiving a notification indicating that a source computer is sharing a user interface element, according to an embodiment of the disclosure.
FIG. 4C is an example method for moving a shared user interface element to another location on the output device of a target computer, according to an embodiment of the disclosure.
FIG. 4D is an example of an output device of a target computer displaying a user interface element outside of a move cart user interface element, according to an embodiment of the disclosure.

Referring now to FIG. 4A, shown is an example of an output device associated with a target computer, according to an embodiment of the disclosure. As shown in FIG. 4A, a target computer, such as 115 in FIG. 1, may include an output device 410A that displays a move cart user interface element 415A.

Referring now to FIG. 4B, shown is an example of an updated output device associated with a target computer after receiving a notification indicating that a source computer has shared a user interface element. As discussed above, upon receiving the notification, the output device 410B of the target computer may be automatically, or in response to some other trigger, updated to display the shared user interface element 420B within a move cart user interface element 415B. In certain embodiments, the move cart user interface element 415B may be highlighted to draw attention to newly shared user interface element 420B by, for instance, changing color, flashing, displaying a popup and so forth. For example, as shown in FIG. 4B, the move cart user interface element 415B may include a thick and dotted border line, such as border line 425B.

Referring now to FIG. 4C, shown is an example method for moving a shared user interface element to another location on the output device of a target computer. As shown in FIG. 4C, a user may move a user interface element 420 B from move cart user interface element 415C by dragging the user interface element 420 B to another location on the output device 410C.

Referring now to FIG. 4D, shown is an example of an output device associated with a target computer displaying a user interface element outside of a move cart user interface element. As shown in FIG. 4D, upon moving a shared user interface element to another location on the output device of the target computer as discussed above in FIG. 4C, the output device 410D may display the user interface element 420D outside the move cart user interface element 415D.

Figure 5A:
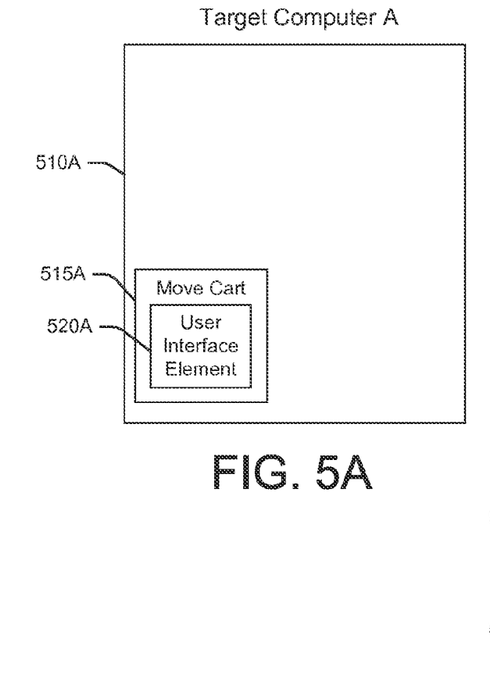
FIGS. 5A-5C are examples of output devices associated with one or more target computers, according to an embodiment of the disclosure.
Figure 5B:
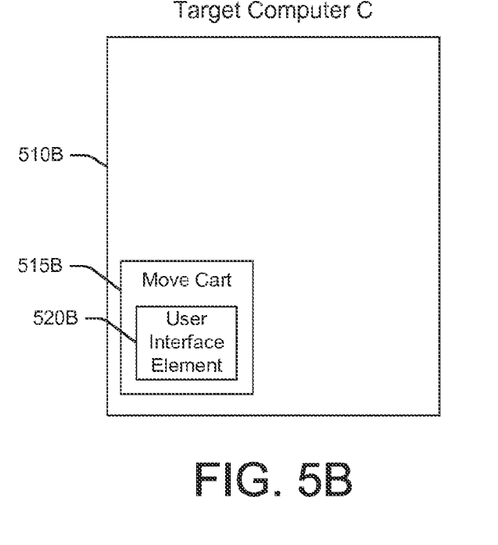
Figure 5C:
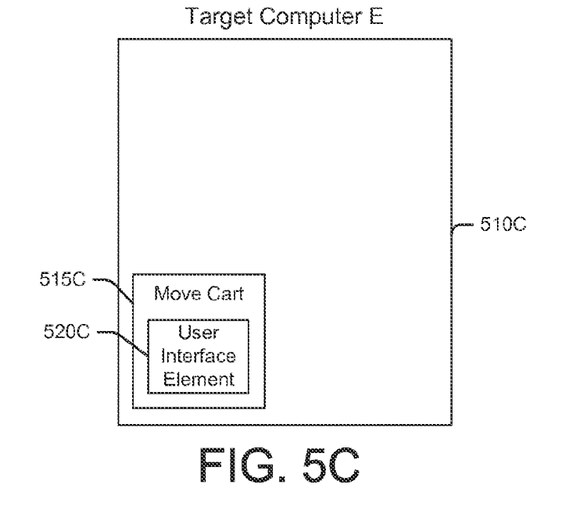

Referring now to FIGS. 5A-5C, shown are examples of output devices associated with one or more target computers, according to an embodiment of the disclosure. As described above, a notification may be transmitted to one or more target computers indicating that a user of the source computer has shared a user interface element. In certain embodiments, upon receiving the notification, the one or more target computers may be configured to view the user interface element as a child window of the client application instance running on its computer.

For instance, as shown in FIGS. 5A-5C, one or more users operating target computers A, C, and E, may view output devices 510A, 510B, and 510C, respectively, which may display the shared user interface elements 520A, 520B, and 520C that the user of the source computer would like to share in move cart user interface elements 515A, 515B, and 515C. To this end, multiple target users can receive the notification and independently access the shared user interface elements 520A, 520B, and 520C.

The disclosure is described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for sharing a user interface element between a source computer and one or more target computers, the method comprising:

selecting, based at least in part on a user gesture, by a control device, a user interface element being displayed on an output device of the source computer, wherein the user gesture comprises a finger stroke gesture;

identifying, based at least in part on the user gesture, by the control device, a location within a move cart user interface displayed on the output device of the source computer to move the user interface element, wherein moving the user interface element to a location within the move cart user interface allows a user operating the source computer to share the user interface element with one or more target users respectively operating one or more target computers;

updating, by the control device, the output device of the source computer to display the user interface element within the move cart user interface;

in response to updating the output device, generating, by the control device, a notification indicating that the source computer is sharing the user interface element; and transmitting, by the control device, the notification to the one or more target computers in communication with the source computer.

2. The method of claim 1, wherein the user gesture is generated by the user using an input device or by an input device detecting the user's input.

3. The method of claim 1, wherein the one or more target computers can log into a client application configured to allow the user operating the source computer to share the user interface element with the one or more target users respectively operating the one or more target computers.

4. The method of claim 3, wherein the user can view a list of the one or more target users operating the one or more target computers that are logged into the client application when the user operating the source computer is logged into the client application.

5. A system for moving a user interface element from a source computer to one or more target computers, the system comprising:

a source computer;
one or more target computers; and
a control device configured to:
   select, based at least in part on a user gesture, a user interface element being displayed on an output device of a source computer, wherein the user gesture comprises a finger stroke gesture;
   identify, based at least in part on the user gesture, a location within a move cart user interface displayed on the output device of the source computer to move the user interface element, wherein moving the user interface element to a location within the move cart user interface allows a user operating the source computer to share the user interface element with one or more target users respectively operating one or more target computers;
   update the output device of the source computer to display the user interface element within the move cart user interface;
   generate a notification indicating that the source computer is sharing the user interface element; and
   transmit the notification to the one or more target computers in communication with the source computer.

6. The system of claim 5, wherein the user gesture is generated by the user using an input device or by an input device detecting the user's input.

7. The system of claim 5, wherein each of the one or more target computers can log into a client application configured to allow the user operating the source computer to share the user interface element with the one or more target users respectively operating the one or more target computers.

8. The system of claim 5, wherein the user can view a list of the one or more target users operating the one or more target computers that are logged into the client application when the user operating the source computer is logged into the client application.

9. One or more computer-readable media storing computer-executable instructions that, when executed by at least one processor, configure the at least one processor to:

select, based at least in part on a user gesture, a user interface element being displayed on an output device of a source computer, wherein the user gesture comprises a finger stroke gesture;

identify, based at least in part on the user gesture, a location within a move cart user interface displayed on the output device of the source computer to move the user interface element, wherein moving the user interface element to a location within the move cart user interface allows a user operating the source computer to share the user interface element with one or more target users respectively operating one or more target computers;

update the output device of the source computer to display the user interface element within the move cart user interface;

generate a notification indicating that the source computer is sharing the user interface element; and transmit the notification to the one or more target computers in communication with the source computer.

10. The computer-readable media of claim 9, wherein the user gesture is generated by the user using an input device or by an input device detecting the user's input.

11. The computer-readable media of claim 9, wherein each of the one or more target computers can log into a client application configured to allow the user operating the source computer to share the user interface element with the one or more target users respectively operating the one or more target computers.

* * * * *